July 16, 1963 D. P. WAITE 3,098,215

DATA STORAGE AND TRANSMISSION SYSTEM

Filed Dec. 27, 1957 3 Sheets-Sheet 1

INVENTOR.
DAVID P. WAITE.
BY
[signature]
ATTORNEY.

DATA STORAGE AND TRANSMISSION SYSTEM

Filed Dec. 27, 1957 3 Sheets-Sheet 2

INVENTOR.
DAVID P. WAITE.
BY
ATTORNEY.

July 16, 1963 D. P. WAITE 3,098,215

DATA STORAGE AND TRANSMISSION SYSTEM

Filed Dec. 27, 1957 3 Sheets-Sheet 3

INVENTOR.
DAVID P. WAITE.
BY

ATTORNEY.

3,098,215
DATA STORAGE AND TRANSMISSION SYSTEM
David P. Waite, Topsfield, Mass., assignor to General Electric Company, a corporation of New York
Filed Dec. 27, 1957, Ser. No. 705,528
3 Claims. (Cl. 340—151)

This invention relates to data storage and transmission systems and more particularly to an address-bearing subscriber circuit for rapidly transmitting data upon receipt of an interrogation signal including the particular address of the subscriber circuit.

Data pertinent to services rendered subscribers, such as dwellings and small business establishments, must frequently be collected by the organiaztions providing the services. For example, gas, electric and water meters at the location of the subscribers measure the quantity of the respective product consumed. It is common practice for an individual to travel to the location at certain intervals to read the dials of the meters. Collection of data by this method is inflexible, slow, subject to error and relatively costly. Furthermore, if an error is made in reading a meter, obtaining the correct reading prior to the next scheduled trip to the location of that meter is unduly expensive.

It would be desirable to employ a means for locally coding and storing readings of meters of the type described, whereby a central data reduction center for a district including many dwellings and small business establishments can gather the information remotely and at high speed and carry out desired operations on the collected data. These operations may include mathematical calculations, tabulations, sorting operations, and automatic billing operations. Such a means would be further useful for the transmission of simple messages to a central information gathering system.

To operate in a network employing such a data reduction center, it is necessary that the subscriber's coded information be stored, either automatically or manually, in a manner to permit high speed read-out to the district data reduction center upon receipt of an interrogation signal from the data reduction center. It is also necessary that the subscriber's equipment bear an address, so that it will respond only to an interrogation signal including that address. It is desirable that such a system operate at high speed with a high degree of reliability, but with relatively low cost in relation to the service rendered. The subscriber's equipment should be as simple as possible consistent with the accuracy, reliability and speed desired.

It is therefore the principal object of this invention to provide apparatus for locally coding and storing data whereby a central data reduction center can remotely and rapidly gather the stored data.

Another object of this invention is to provide apparatus for storing data in a manner to permit rapid and accurate transmission of signals representing the stored data upon receipt of an interrogation signal.

Another object of this invention is to provide address-bearing apparatus for storing data in a manner to permit high speed read-out of the stored data in response only to an interrogation signal including that address.

Another object of this invention is to provide apparatus for storing data in binary digital form and for rapidly transmitting a signal representing the stored data in response to a uniformly recurring pulse train.

Another object of this invention is to provide apparatus for storing an address in binary digital form and for rapidly comparing the stored address with an address represented by a received signal train.

The foregoing objects are achieved by providing a network including a pair of multielectrode stepping tubes, each tube comprising a plurality of cathodes arranged in spatial series, a control electrode system, and an anode; the discharge of the tube being adapted to transfer sequentially from one to an adjacent one of said cathodes along the series upon application of a trigger signal to the control electrode system. An impedance is connected in series with each of the cathodes of each stepping tube. Cooperating means is provided for altering the value of each impedance whereby a signal representing either a binary 0 or a binary 1 is produced at each cathode when discharge current passes through that cathode. The cathodes of each tube are coupled in parallel to a respective output terminal. The impedances connected to the first stepping tube are arranged to store binary digital information representing the address of the network. Upon receipt of a series of uniformly recurring trigger signals from the central data reduction center at its control electrode system, the first stepping tube delivers at its output terminal a first signal train representing the stored address. This first signal train and a second signal train representing the desired subscriber address transmitted from the central data reduction center are applied to a comparator. When both signals applied to the comparator represent the same address, an output signal is produced by the comparator. This comparator output signal controls a gating circuit and thereby applies uniformly recurring trigger signals to the control electrode system of the second stepping tube. The impedances connected to the second stepping tube are arranged to store binary digital information representing the data to be transmitted to the central data reduction center. This information is transmitted from the second stepping tube upon application of the trigger signals applied to its control electrode system and controlled by the comparator output.

The invention will be described with reference to the accompanying drawings, wherein.

Figures 1, 2:
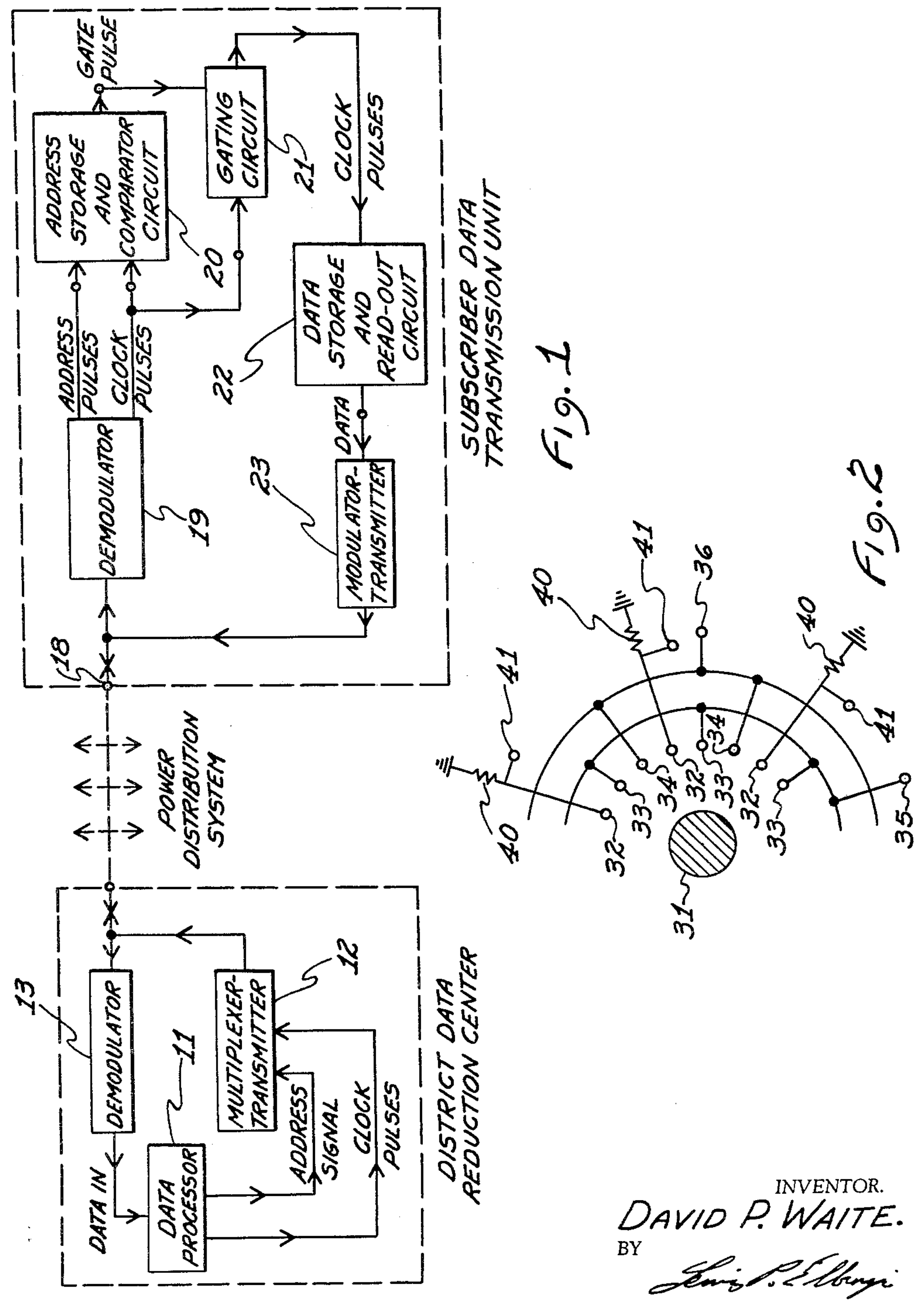
FIGURE 1 is a circuit diagram of the data storage and transmission unit of this invention and illustrates its relation to a district data reduction system.
FIGURE 2 is a simplified diagram showing the construction of a glow transfer tube useful in the operation of this invention.

In the district data reduction system of FIG. 1 a plurality of subscriber data transmission units including the networks of this invention are employed. The district data reduction center controls communications both to and from all subscriber data transmission units throughout the district. An economical means of communication for the district data reduction system is the district power distribution system. Interrogation and control signals from the data reduction center are multiplexed on carrier frequencies on the power transmission lines. Signals representing the data transmitted from the subscriber units are also multiplexed on carrier frequencies for transmission to the data reduction center.

Data processor 11 controls and synchronizes the collection and processing of data for the entire district. The data processor provides uniformly recurring signals, known as clock pulses, for synchronizing the entire system and provides address signals for interrogating a particular subscriber data transmission unit. The clock pulses and address signals provided by the data processor are coupled to a multiplexer-transmitter 12. Multiplexer-transmitter 12 modulates a pair of carrier frequencies with the respective clock pulses and address signals. This modulated carrier frequency pair is coupled to the power distribution system for transmission. Although all subscriber data transmission units receive the two carrier signals, the subscriber unit bearing the address being transmitted at that instant is the only one to respond and transmit information at carrier frequency back to the data reduction center. The carrier frequency signal received at the data reduction center is coupled to demodulator 13 and applied to an input terminal of data processor 11. Data processor 11 then performs the aforementioned desired operations on the collected data.

Although a particular circuit for a district data reduction center has been shown in FIG. 1 in order to clarify the operation of this invention, any other type of data control and reception center may be employed for operation with the subscriber data transmission unit of this invention. It is preferred, however, that the subscriber data transmission unit be employed in a data collection district wherein an address signal is received and timing signals, such as clock pulses, are available for synchronization.

The subscriber data transmission unit (FIG. 1) is connected to and receives signals from the power distribution system at a terminal 18. The received signals are coupled to a demodulator 19, where they are separated from their respective carriers and delivered on two output leads. Thus, the output of demodulator 19 is an interrogation signal including the address of the subscriber unit to be interrogated and a clock pulse signal. Both output signals of demodulator 19 are applied to an address storage and comparator circuit 20. The clock pulse signal is also applied to one input terminal of a gating circuit 21.

The address storage and comparator circuit 20 stores information representing in binary digital form the address of the local subscriber data transmission unit. Circuit 20 is adapted to compare the address represented by the stored information and the address included in the incoming interrogation signal and to deliver an output gate pulse when both addresses are the same. The gate pulse delivered by circuit 20 initiates a network response which results in transmission of the desired subscriber-originated information to the district data reduction center. Thus, address storage and comparator circuit 20 examines all interrogation signals transmitted from the data reduction center and initiates response of the local subscriber data transmission unit only when the interrogation signal is addressed thereto.

Gate pulses delivered by address storage and comparator circuit 20 are coupled to input terminal of gating circuit 21. When a gate pulse is produced by circuit 20 it triggers gating circuit 21 and allows a predetermined number of clock pulses to be delivered at the gating circuit output terminal. Gating circuit 21 is connected to a data storage and read-out circuit 22. Data storage and read-out circuit 22 has information stored therein in binary digital form and is adapted to rapidly deliver signals representing this stored information in response to a uniformly recurring pulse train. Thus, upon application of clock pulses from gating circuit 21, circuit 22 delivers an output signal representing the information stored therein. The signal delivered by circuit 22 is coupled to a modulator-transmitter 23. Modulator-transmitter 23 modulates a carrier frequency with the information-bearing signal received and delivers this modulated carrier to terminal 18 for transmission to the district data reduction center.

A multielectrode stepping tube is employed in both the address storage and comparator circuit 20 and the data storage and read-out circuit 22. A particular multielectrode stepping tube, known as a glow transfer tube, and useful in the circuits of thisi nvention is shown in FIG. 2. The construction of such a tube, its operation, and useful cooperating circuits are described in an article by R. C. Bacon and J. R. Pollard, "The Dekatron," Electronic Engineering, pp. 173–177, May 1950. This gas discharge type tube comprises an anode 31, a plurality of cathodes 32, a plurality of first guide electrodes 33, and a plurality of second guide electrodes 34. The number of cathodes, first guide electrodes, and second guide electrodes, is the same. The cathodes 32 are equally spaced about the circumference of anode 31. A first guide electrode 33 and a second guide electrode 34 are disposed in clockwise succession between each pair of cathodes 32. The first guide electrodes 33 are connected in parallel to a common input terminal 35. The second guide electrodes 34 are connected in parallel to a common input terminal 36. In operation, the first guide electrodes 33 and the second guide electrodes 34 are maintained at a quiescent direct voltage substantially positive with respect to the cathodes 32. For typical operation the anode 31 may be maintained at +400 v., the first guide electrodes 33 and the second guide electrodes 34 may be maintained at +60 v., and the cathodes 32 may be maintained at 0 v.

Assume that a gas discharge is taking place between anode 31 and a particular one of cathodes 32. Since the cathode is more negative than its adjacent guide electrodes, there is no tendency for the discharge to move clockwise or counterclockwise around the tube. If, now, a negative pulse of 120 v. is applied to terminal 35, the discharge will transfer in a clockwise direction from the cathode 32 that was conducting to the adjacent clockwise-located first guide electrode 33. If a negative pulse of 120 v. is now applied to terminal 36 at the same time that the negative pulse is removed from terminal 35, the discharge will transfer clockwise from the first guide electrode 33 that was conducting to the adjacent clockwise-located second guide electrode 34. The discharge will transfer clockwise from the second guide electrode 34 that was conducting to the adjacent clockwise-located cathode 32 upon restoration of the original potential of +60 v. to terminal 36. The function of the guide electrode system is thus to render certain the direction of motion of the discharge. One complete cycle of operation of the tube has been described; for each such cycle of operation the discharge, or conduction current, moves from one cathode 32 to the next clockwise-located cathode.

The aforementioned article describes several circuits wherein a single pulse may be split to provide two sequential signals to respective terminals 35 and 36 in order that the discharge transfer from one cathode 32 to the next cathode. In one such circuit an input pulse of −120 v. may be applied simultaneously to terminal 35 and the input terminal of an integrator. The integrator is designed with a time constant such that the voltage available at its output terminal, which is connected to terminal 36, reaches −120 v. at the time that the pulse applied to terminal 35 is removed. As the effect of such a circuit is that of applying two sequential negative pulses to respective terminals 35 and 36, the discharge will transfer in the desired clockwise direction in the tube. Upon the discharge of the integrator circuit, the gas discharge in the multielectrode stepping tube will then transfer to the next sequential cathode 32. Thus, the discharge transfers from a cathode 32 to an adjacent cathode upon each application of a pulse to the circuit described.

A resistor 40 is connected between each cathode 32 and ground. A terminal 41 is connected to each cathode. A positive voltage will appear at a particular terminal 41 when the discharge takes place between anode 31 and the cathode 32 to which this terminal is connected. With the resistors 40 connected as described, a positive pulse is produced at one of the terminals 41 for each input pulse to the stepping tube circuit.

Although a particular multielectrode stepping tube has been described, any similar device available in the art may be employed in this invention. It is preferred, however, that the device employed provide means for connecting a resistor in circuit with each of a plurality of similar electrodes which conduct current sequentially.

Other examples of stepping tubes which would be useful in this invention are described in articles by J. R. Acton, "The Single-Pulse Dekatron," Electronic Engineering, pp. 48–51, February 1952, and by A. Kingsnorth, "Industrial Counting and Control," Industrial Canada, January 1956.

Figure 3:
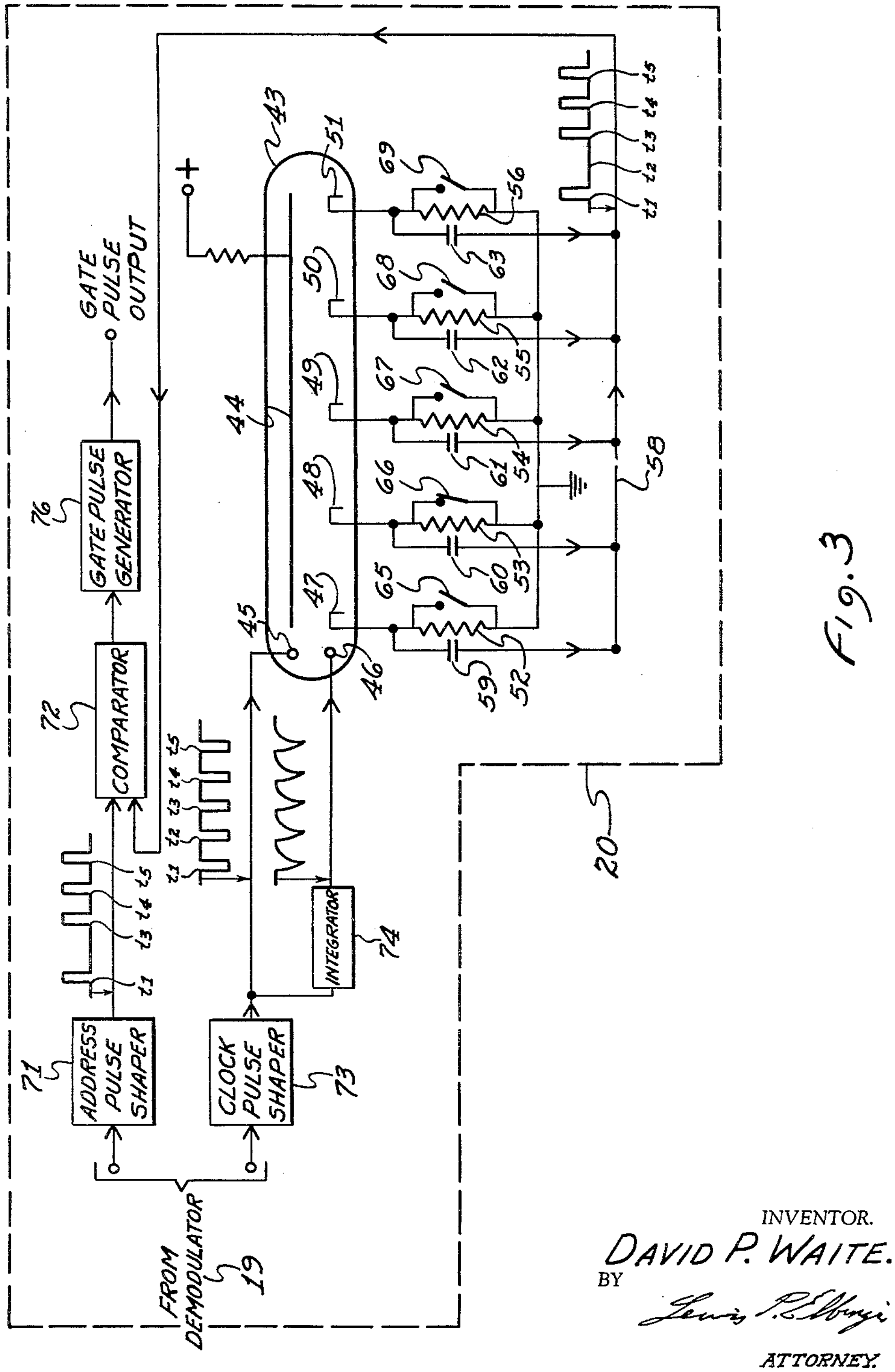
FIGURE 3 is a diagram in detail of the address storage and comparator circuit of FIG. 1.

The employment of a multielectrode stepping tube for storing information and for delivering an output signal representing the stored information is shown in the address storage and comparator circuit 20 of FIG. 3. The stepping tube 43 is shown schematically and comprises an anode 44 and a control electrode system consisting of a plurality of first guide electrodes 45 and a plurality of second guide electrodes 46. For simplicity, stepping tube 43 is illustrated as having only cathodes 47, 48, 49, 50 and 51. Resistors 52, 53, 54, 55 and 56 are connected between respective cathodes 47, 48, 49, 50 and 51 and ground. Cathodes 47, 48, 49, 50 and 51 are connected to a common output lead 58 through respective coupling capacitors 59, 60, 61, 62 and 63. Single-pole, single-throw switches 65, 66, 67, 68 and 69 are connected across respective resistors 52, 53, 54, 55 and 56. Switches 65–69 are employed for storing in the circuit information represented in binary digital code. Thus, as the discharge is directed between anode 44 and one of cathodes 47–51, a positive pulse is produced at that cathode and delivered on lead 58 if the switch connected to that cathode is open. If the switch is closed, no pulse voltage will be developed across the associated cathode resistor.

If the presence of a pulse is defined as the binary digit 1 and the absence of a pulse as the binary digit 0, the circuit of FIG. 3 stores binary 1's by maintaining predetermined switches open and binary 0's by maintaining predetermined switches closed. Thus, as the discharge in tube 43 is stepped along the sequentially disposed cathodes 47–51, an output pulse train is delivered on lead 58, the content of which is determined by the prearranged condition of switches 65–69.

The output signals of demodulator 19 of FIG. 1 are applied to the circuit of FIG. 3. The interrogation signal including the address of the subscriber unit to be interrogated is applied to the input terminal of address pulse shaper 71. The output signal of address pulse shaper 71 is a group of positive pulses, representing in binary digital code the address of the subscriber unit to be interrogated. For use with the five-cathode exemplary stepping tube 43, the address code group is five clock periods in duration, the beginning of each clock period being determined by the occurrence of a clock pulse. The beginning of each of the five clock periods of the address code group is designated respectively $t_1$, $t_2$, $t_3$, $t_4$, $t_5$. In the address code group being delivered by pulse shaper 71 in this example, the binary digital code group represented is 10111. The output signal of pulse shaper 71 is applied to one input terminal of a comparator 72.

The clock pulse signal is applied to the input terminal of clock pulse shaper 73. The output signal of clock pulse shaper 73 is a group of uniformly recurring negative pulses, the leading edge of each pulse defining the beginning of a clock period. The clock pulse group has been synchronized with the address code group in data processor 11 of FIG. 1. The output pulses of clock pulse shaper 73 are applied directly to the first guide electrode system 45 and to the input terminal of an integrator 74. The output signal of integrator 74 is applied to the second guide electrode system 46. In the manner previously described, the application of a clock pulse and its integrator output counterpart to the control electrode system of stepping tube 43 will effectuate the transfer of the discharge of tube 43 sequentially in a predetermined direction from one cathode to an adjacent cathode.

The circuit is adapted for the discharge to transfer sequentially along cathodes 47–51 when the respective clock pulses occurring from $t_1$–$t_5$ are applied to the control electrode system of tube 43. For each clock pulse of the incoming group of five clock pulses, a signal representing a binary digit is delivered on lead 58. In the example shown, switches 65–69 have been arranged so that the pulse code group delivered on lead 58 represents 10111. The pulse code group delivered on lead 58 is applied to the other input terminal of comparator 72.

The input signals delivered to comparator 72 comprise a pulse code group representing the address of the subscriber unit to be interrogated and a pulse code group representing the address of the local subscriber data transmission unit. Comparator 72 compares the two input pulse code groups and delivers a signal to a pulse generator 76 when both pulse code groups are alike. Comparator 72 may be any one of several devices well-known in the art for comparing pulse trains. In one such comparator, a coincidence gate delivers a pulse to an integrating device each time a pair of input signals is alike. When the output voltage of the integrating device reaches a predetermined level, an output signal is produced. This predetermined voltage level is that assumed by the integrating circuit when the coincidence gate has produced a number of pulses equal to the number of information bits in each of the pulse code groups received. Other comparators using logical circuit techniques are described in a book by R. K. Richards, "Arithmetic Operations in Digital Computers," pp. 290–291, D. Van Nostrand Company, Inc., Princeton, New Jersey, 1955. For example, one pulse code group may be subtracted from the other pulse code group and a zero detection method employed.

A gate pulse is delivered by pulse generator 76 upon receipt of a signal from comparator 72. Thus, a gate pulse is delivered by address storage and comparator circuit 20 whenever the interrogation signal received includes the address of the local subscriber data transmission unit.

Figure 4:
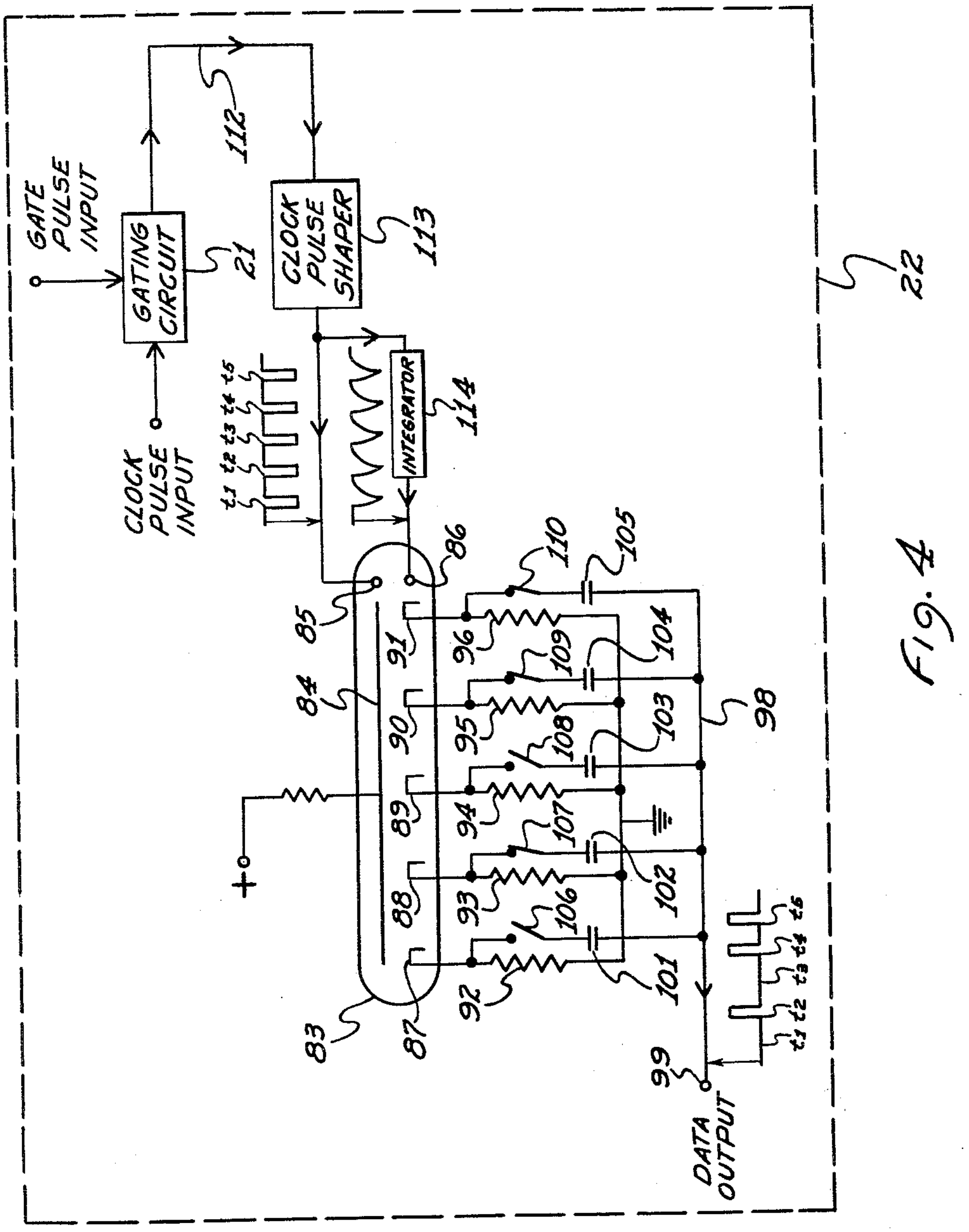
FIGURE 4 is a diagram in detail of the data storage and read-out circuit of FIG. 1.

The employment of a multielectrode stepping tube for storing information and for delivering an output signal representing the stored information is also shown in the data storage and read-out circuit 22 of FIG. 4. Again the stepping tube 83 is shown schematically and comprises an anode 84, a control electrode system consisting of first guide electrode system 85 and second guide electrode system 86, and a plurality of cathodes 87, 88, 89, 90 and 91. Resistors 92, 93, 94, 95 and 96 are connected between respective cathodes 87, 88, 89, 90 and 91 and ground. Cathodes 87, 88, 89, 90 and 91 are connected by way of a common output lead 98 to an output terminal 99 through respective coupling capacitors 101, 102, 103, 104 and 105. Single-pole, single-throw switches 106, 107, 108, 109 and 110 are connected in series with respective coupling capacitors 101, 102, 103, 104 and 105. Switches 106–110 are employed for storing in the circuit information represented in a binary digital code for transmission to the district data reduction center. As the discharge in tube 83 is stepped along the sequentially disposed cathodes 87–91, an output pulse train is delivered on lead 98, the content of which is determined by the prearranged condition of switches 106–110. In accordance with the previous pulse definition of a binary 1 and a binary 0, the circuit of FIG. 4 stores binary 1's by maintaining predetermined switches closed and binary 0's by maintaining predetermined switches open.

The clock pulse signal of demodulator 19 of FIG. 1 is applied to one input terminal of gating circuit 21 of FIG. 4. The output terminal of gate pulse generator 76 of FIG. 3 is connected to the other input terminal of gating circuit 21. Upon application of a gate pulse to gating circuit 21, a predetermined number of clock pulses are delivered on lead 112 from the output terminal of gating circuit 21. In the present example wherein five binary bits of information are stored in the cathode circuits of stepping tube 83, a group of five clock pulses is delivered by gating circuit 21 whenever a gate pulse is applied thereto. These clock pulses are applied to the input terminal of a clock pulse shaper 113. The output signal of clock pulse shaper 113 is a group of uniformly recurring negative pulses. These pulses are applied directly to the first guide electrode system 85 and to the input terminal of an integrator 114. The output signal of integrator 114 is applied to the second guide electrode system 86. As described previously, this circuit is adapted so that the discharge is transferred sequentially along cathodes 87–91 when the recurring clock pulses are applied to the control electrode system of tube 83. For each clock pulse of the incoming group of five clock pulses, a signal representing a binary digit is delivered on lead 98. In the example shown, switches 106–110 have been arranged so that the pulse code group delivered on lead 93 represents 01011. The pulse code group delivered at terminal 99 is applied to modulator-transmitter 23 of FIG. 1 for transmission to the district data reduction center.

Although each of FIGURES 3 and 4 discloses means for storing five binary digits in the circuits associated with the stepping tubes, this invention is not so limited. The number of binary digits stored in data storage and read-out circuit 22 need not be the same as that stored in address storage and comparator circuit 20. However, each stepping tube should receive clock pulses at least equal in number to the number of binary digits stored.

In order that the first binary digit delivered by a stepping tube be the one stored in a particular cathode circuit, it is desirable that the number of pulses in a clock pulse group be equal to the number of cathodes in the tube. In this manner each clock pulse group will cause the discharge to step completely around the tube from the designated first to the designated last cathode. Thus, when the next clock pulse group arrives, the discharge will immediately transfer to the designated first cathode.

The switching arrangements of FIG. 3 or FIG. 4, or any equivalent arrangement, may be employed to selectively alter the output signal of the multielectrode stepping devices by either altering the value of the impedances connected in series with each of the output electrodes of the stepping device as in FIG. 3 or disconnecting output electrodes of the stepping device from the output lead as in FIG. 4. The switches associated with the data storage and read-out circuit may be actuated by automatic measurement means or manually from a separate keyboard. The order of the switches may be automatically altered as the purpose and the nature of the stored data is changed.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A data storage and transmission unit comprising: a source of synchronized addressing pulses and clock pulses, said addressing pulses being arranged in a binary coded group and said clock pulses recurring uniformly; means for storing a binary coded group of address pulses and for transmitting said group of address pulses in response to said clock pulses; means for serially comparing said group of addressing pulses with said group of address pulses and for producing an output signal when said group of addressing pulses are arranged in the same binary code grouping as said group of address pulses; pulse generating means responsive to said output signal from said comparator means for producing a gate pulse; gating means responsive to the presence of said gate pulse for transmitting said clock pulses; and register means for storing binary coded data and for transmitting said data in response to said clock pulses transmitted by said gating means.

2. A system for collecting data from a plurality of subscribers including a data processor located at a data reduction center, a plurality of subscriber data transmission units, each unit responsive to a corresponding unique interrogation signal from said data processor including a unique address pulse code group and uniformly recurring pulses, a first communication means between said center and all of said units for transmitting any one of a plurality of unique interrogation signals from said center to each of said units, a given one of said units comprising a first register means for storing unique address information in digital form and delivering in response to said uniformly recurring pulses a unique address signal consisting of a pulse code group representing the address information stored; a comparator means connected to said first register means and first communication means for serially comparing the pulse code group of said unique address signal with the pulse code group of said interrogation signal and for providing a coincidence signal when said pulse code groups correspond; a second register means connected to said comparator means for storing data in digital form and effective upon receipt of said coincidence signal from the comparator to generate a pulse code group representative of said data stored therein in response to said uniformly recurring pulses; and a second communication means between the second register of said given unit and said data reduction center for serially transmitting said pulse code group representative of said data from said given unit to said data processor.

3. A data storage and transmission unit comprising: a source of synchronized addressing pulses and clock pulses, said addressing pulses being arranged in a binary coded group and said clock pulses recurring uniformly; means for storing a binary coded group of address pulses and for transmitting said group of address pulses in response to said clock pulses; means for serially comparing said group of addressing pulses with said group of address pulses and for producing an output signal when said group of addressing pulses are arranged in the same binary code grouping as said group of address pulses; pulse generating means responsive to said output signal from said comparator means for producing a gate pulse; gating means responsive to the presence of said gate pulse for transmitting said clock pulses; and register means for storing binary coded data and for transmitting said data in response to said clock pulses transmitted by said gating means, said register means including a circuit having a plurality of distinct current paths, each path having impedance means for producing a distinct signal pulse at an output terminal in response to conduction of current therein, means responsive to said clock pulses for sequentially switching said conduction of current through said current paths, means for coupling each output terminal to a common output terminal, and switching means for preventing signal pulses from being produced at selected ones of said output terminals.

References Cited in the file of this patent

UNITED STATES PATENTS

| | | |
|---|---|---|
| 2,568,177 | Vroom | Sept. 18, 1951 |
| 2,571,800 | Vroom | Oct. 16, 1951 |
| 2,607,891 | Townsend | Aug. 19, 1952 |
| 2,651,740 | Lair | Sept. 8, 1953 |
| 2,664,555 | Thomas et al. | Dec. 29, 1953 |
| 2,696,572 | Schmid | Dec. 7, 1954 |
| 2,719,284 | Roberts | Sept. 27, 1955 |
| 2,740,106 | Phelps | Mar. 27, 1956 |
| 2,812,509 | Phelps | Nov. 5, 1957 |
| 2,870,258 | Cooper | Jan. 20, 1959 |